United States Patent [19]

Gibson et al.

[11] Patent Number: 4,582,289

[45] Date of Patent: Apr. 15, 1986

[54] SELF INDEXING LATCH SYSTEM

[75] Inventors: John C. Gibson, Rogersville; John A. Calvert, New Market; Malcolm F. Nesmith; Richard A. Cloyd, both of Huntsville, all of Ala.

[73] Assignee: The United States of America as represented by the Administrator of the National Aeronautics and Space Administration, Washington, D.C.

[21] Appl. No.: 580,397

[22] Filed: Feb. 15, 1984

[51] Int. Cl.[4] ............................................. F16M 13/00
[52] U.S. Cl. .................................. 248/550; 248/316.4
[58] Field of Search ................. 248/316.4, 316.1, 550; 269/218, 225, 242, 258, 244; 74/424.8 B, 89.15

[56] References Cited

U.S. PATENT DOCUMENTS

| | | | |
|---|---|---|---|
| 1,337,484 | 4/1920 | Ruoff | 269/218 |
| 2,727,325 | 12/1955 | Jurinic | 248/316.1 X |
| 3,050,301 | 8/1962 | Palazzolo | 269/218 |
| 3,493,233 | 2/1970 | Foufounis | 74/89.15 |
| 3,844,177 | 10/1974 | Bourassa | 74/89.15 |
| 4,448,406 | 5/1984 | Hallberg et al. | 269/242 X |

Primary Examiner—Ramon S. Britts
Assistant Examiner—Ramon O. Ramirez
Attorney, Agent, or Firm—Joseph H. Beumer; John R. Manning; Leon D. Wofford, Jr.

[57] ABSTRACT

A self-latching jaw assembly is illustrated which includes a pair of latching jaws (A) and (B) for latching a fitting of an associated structure such as the keel fitting (50) of a space telescope. The jaw assembly automatically locates the fitting received on a positioning pedestal (52) and latches it in its original location on the pedestal without need of precision alignment. The first jaw (A) is actuated and moved to the right whereupon a reciprocating plunger (62) will have been extended from the nose (64) of the jaw and will sense the hub (50b) of the spool (50a). A jaw position responsive switch (72) is then actuated to terminate the drive motor (E) of the jaw (A). The astronaut will then actuate the drive motor (F) of the jaw (B) and the jaw will move to the left whereupon standoff (82) will engage the face (64a) of the jaw (A) in a latching position. In the latching position, the noses (64) and (83) of the jaws (A) and (B) will be under the flanges of the spool (50a).

19 Claims, 4 Drawing Figures

SELF INDEXING LATCH SYSTEM

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

The invention relates to a latching assembly for locating and latching an adapter fitting of an associated structure regardless of its original location.

Prior clamping devices and work holders are disclosed in U.S. Pat. Nos. 3,844,177, 3,493,233, and 3,050,301 which generally disclose the use of movable clamping jaws operated by various screw drive arrangements. In particular, U.S. Pat. No. 3,050,301 discloses a work holder clamp including a pair of jaws which are driven by means of differential gearing. A workpiece is positioned between the jaws and a control shaft is rotated. As soon as one of the jaws engages the workpiece the gear drive becomes stationary. The other jaw is then moved toward the workpiece and engaged.

While the above are suitable for many applications where rigid clamping without regards to force is required, the structures are not satisfactory where the clamping forces are desired to be minimized and other than rigid locking between parts is desired. In most prior clamping devices of the above type it is also required that the part to be clamped is positively positioned for clamping or latching.

Accordingly, an important object of the present invention is to provide a latch assembly which will automatically locate an adapter fitting of an associated structure such as the keel fitting of a space telescope, and latch the fitting where it is initially located with minimal forces acting on the fitting.

Still another important object of the present invention is to provide a latch assembly having a pair of movable jaws which will locate an adaptor fitting of a keel of a space telescope and latch the keel fitting where it is originally positioned.

Still another important object of the present invention is to provide a self-latching assembly in which a keel fitting of a space telescope may be latched with twenty-five pounds or less force exerted on the keel fitting.

Still another important object of the present invention is to provide a self-latching assembly which will automatically locate a keel fitting of a space telescope and latch the keel fitting between two movable jaws wherein the keel fitting is restrained against movement in vertical and lateral directions while it is permitted to move in a transverse lateral direction.

SUMMARY OF THE INVENTION

The above objectives are accomplished according to the present invention by providing a latching assembly for sensing and latching an adaptor fitting of an associated structure at the initial location where the adaptor fitting is placed in the assembly. The assembly includes a pair of movable jaws which are both independently moved. A location pedestal is provided in the assembly for initially receiving the adaptor fitting. A first sensor senses the presence of the adaptor fitting on the location pedestal which then produces an indicator signal that the fitting is present. A first of the movable jaws is then driven toward the adaptor fitting and a second sensor is provided for stopping the first movable jaw from engagement of the fitting within twenty-five pounds of force or less. A first jaw position responsive sensor indicates that the adaptor fitting has been so engaged and the drive of the first jaw is terminated. The second jaw is then actuated and driven towards the adaptor fitting. The second jaw is provided with a standoff which engages the first jaw so that the adaptor fitting is latched and restrained in a vertical and lateral direction while permitted movement in a transverse lateral direction. A second jaw position responsive sensor senses the arrival of the second movable jaw in its standoff latching position and terminates drive of the second jaw.

The adaptor fitting is latched in the above described latching action. The first jaw sensor includes a unique plunger mechanism which includes a reciprocating plunger. The entire plunger mechanism may be retracted in and out of the first jaw for storage. The second movable jaw is carried by the latching assembly housing by means of a two-piece support. The two-piece support includes a first block fixed to the second jaw and a second block fixed to the drive for moving the jaw so that relative movement is permitted between the first and second blocks. The first support block stops with the standoff engagement of the second jaw with the first jaw. Thereafter, the second block continues to be driven by the drive until movement of the second block relative to the first block causes the second jaw sensor to be actuated. A highly sensitive latching assembly is thus provided for locating an adaptor fitting in its original position and latching it with a minimal amount of force for restraining two degrees of freedom while permitting movement in a third degree of freedom.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Figure 3:
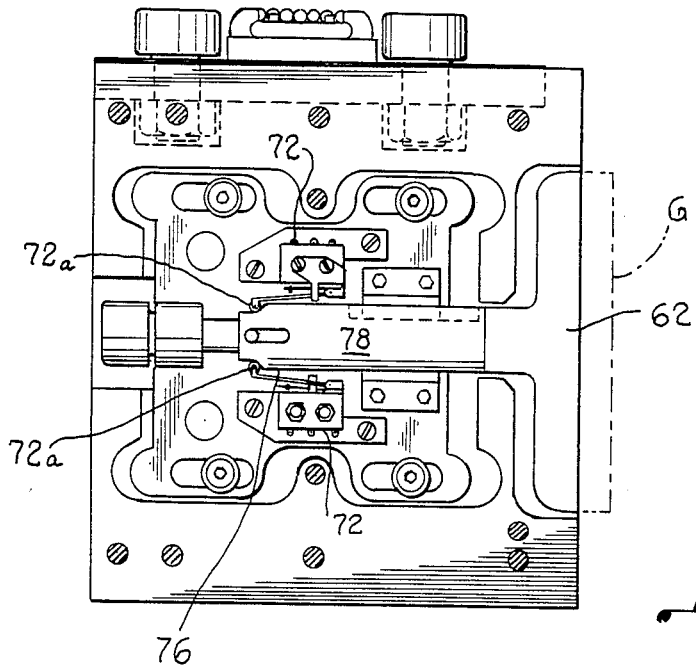
FIG. 3 is a sectional view taken along line 3—3 of FIG. 1.
Figure 4:
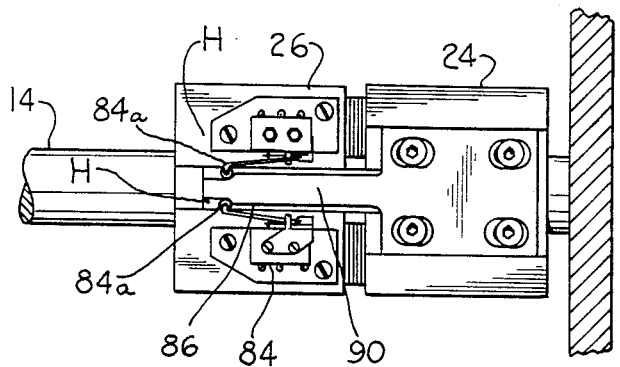
FIG. 4 is a sectional view taken along line 4—4 of FIG. 1.

A self-latching latch assembly for latching an adaptor fitting of an associated structure such as a keel fitting of a space telescope is disclosed. The assembly automatically locates and latches the adaptor fitting 50 regardless of its original position upon being received in the assembly with minimal forces. The assembly includes a base housing 18 having a first movable jaw A and a second movable jaw B carried by the base housing. A first drive transmission means C is operatively connected to the first jaw A for moving the first jaw on the base housing. A second drive transmission means D is operatively connected to the second jaw B for moving the second jaw on the base housing. First and second drive means E and F are provided for driving the first and second transmission means, C and D, respectively. An adaptor fitting location pedestal 52 is carried by the case housing for initially receiving the adaptor fitting and locating it for latching. A sensor means senses the presence of the adaptor fitting on the pedestal and generates a signal indicating that the adaptor fitting has been received. The first drive means E is then actuated. A first jaw position responsive means G (FIG. 3) senses an engagement between the first jaw and the adaptor fitting in a latching position whereby the first drive means is terminated. The second drive F is then actuated to move the second jaw B. A second jaw position responsive means H (FIG. 4) deactuates the second drive means in response to the second jaw arriving at the latching position. A standoff 82 is carried by the second jaw for engaging the first jaw when the second jaw reaches the latching position so that the first and second jaws are spaced apart a predetermined distance in the latching position with the keel fitting being restrained therebetween in two-degrees of freedom only.

Figure 1:
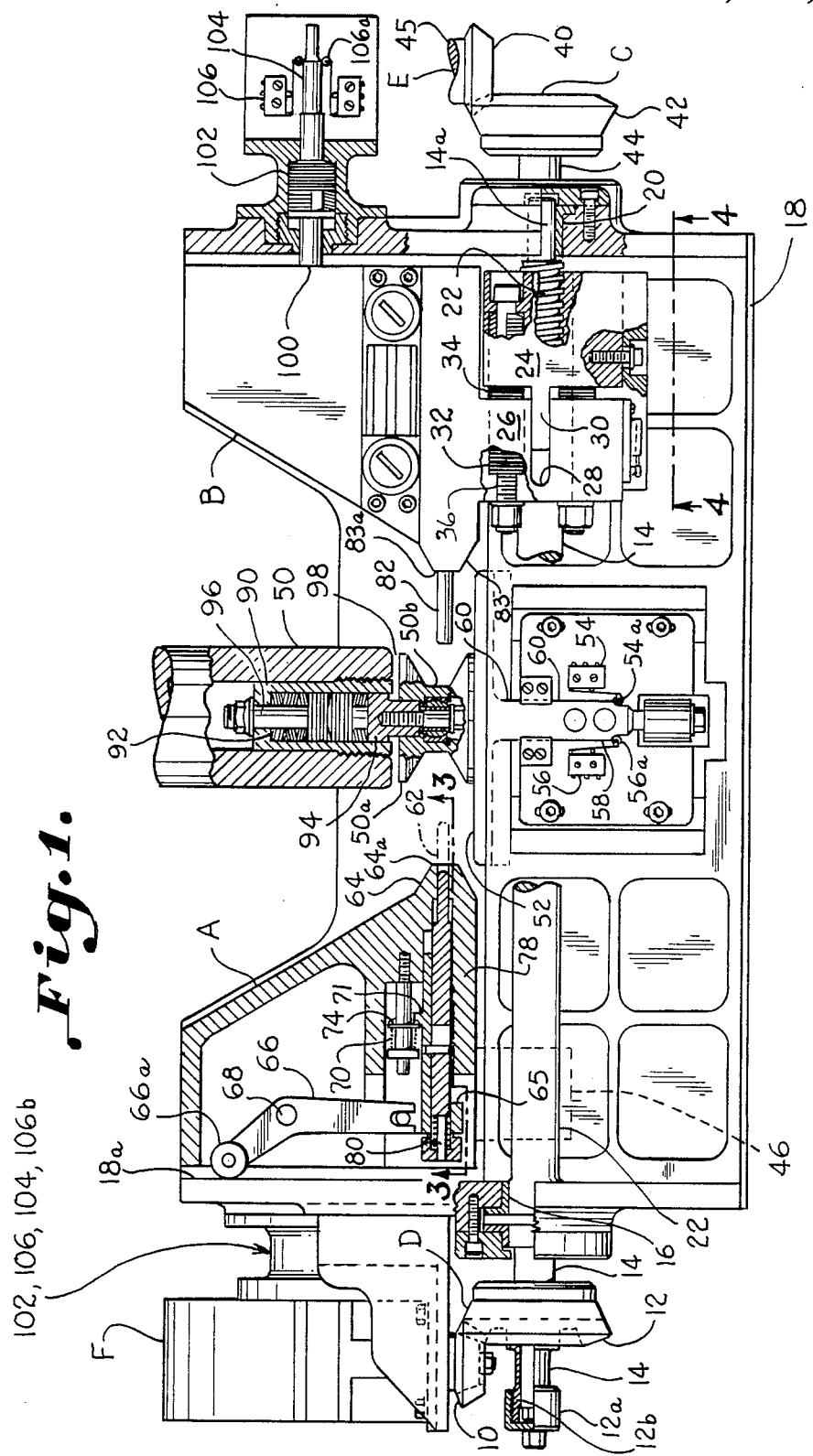
FIG. 1 is an elevation in partial section illustrating a self-latching latch assembly constructed according to the present invention.

Referring now in more detail to FIG. 1, only the drive arrangement for jaw B will be described in detail since the drive for jaw A is essentially the same. The electric motor F drives the jaw B through second drive transmission means D which includes a drive shaft bevel gear 10 fixed to the output drive shaft of motor F which meshes with a ninety degree bevel drive shaft gear 12 fixed to a jaw drive shaft 14. The jaw drive shaft 14 is rotatably journaled in a bearing 16 carried on one end of a housing 18 and is rotatably journaled in a bearing 20 carried on the opposite end of housing 18. The bearing 20 rotatably receives an end 14a of the jaw drive shaft. The jaw drive shaft 14 includes screw threads 22 over essentially its entire length that is enclosed in the housing 18.

Jaw B is carried by means of a two-piece support consisting of support blocks 24 and 26. The screw threads 22 of the drive shaft 14 are threadably mated with screw threads formed in a block 24. Jaw B is pulled toward the fitting to be latched by this drive arrangement.

A second block 26 is connected to the block 24 in a sliding relationship by means of a key slot 28 in block 26 and a key 30 which is part of the block 24. The block 26 is fixed to the jaw B. The block 26 slidably receives the shaft 14 and there is no screw engagement between the block 26 and shaft 14. The block 24 is threaded and travels along the screw threads of the shaft 22 and moves the jaw B accordingly through the block 26. Interconnecting the mounting blocks 24 and 26 together are four spring assemblies 32 which are identical. The spring assemblies 32 include conventional beveled spring washers 34 mounted on bolts 36 which extend through the blocks. Block 24 travels on screws 22 and pushes block 26 through the spring assemblies until block 26 stops due to engagement of jaw B with the adaptor fitting. Then the block 24 continues to travel until the spring washers 34 are compressed and the gap between the blocks is closed.

Figure 2:
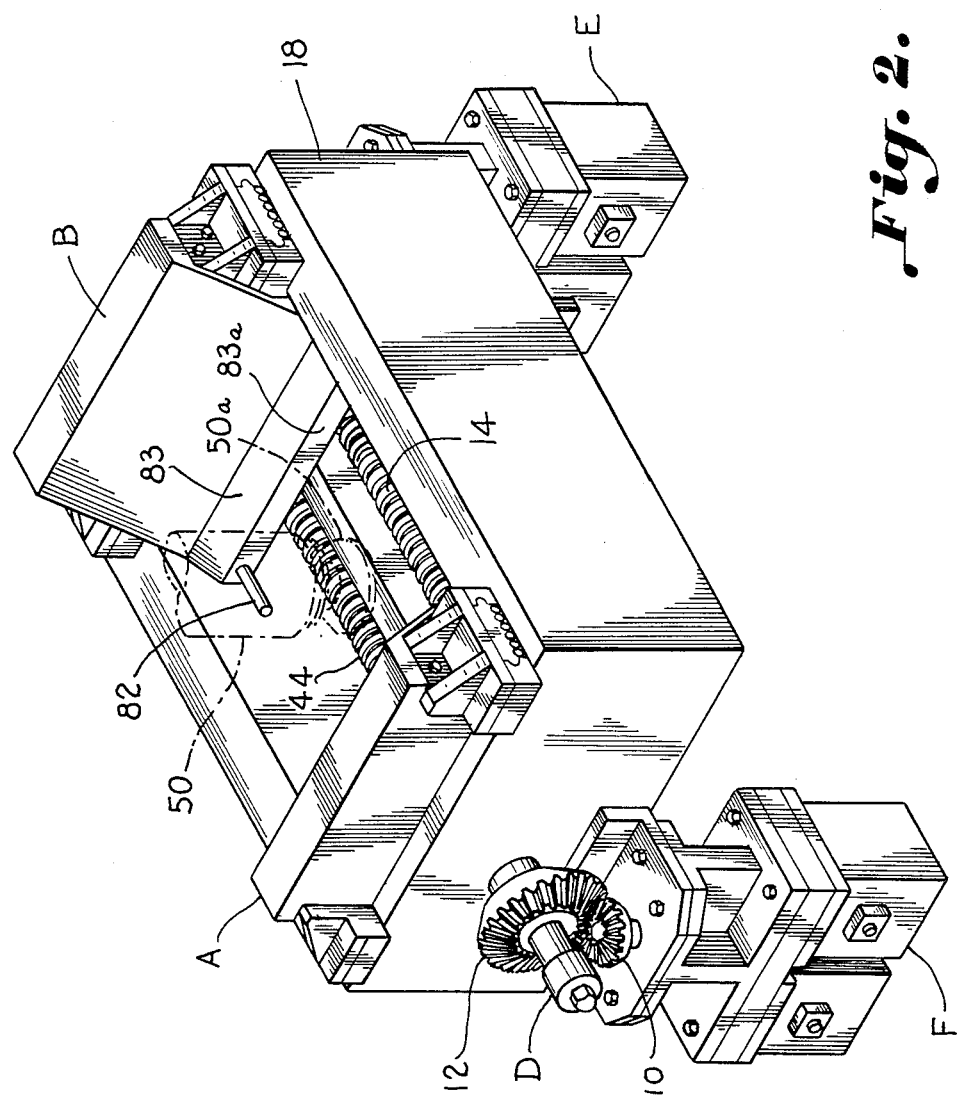
FIG. 2 is a perspective view illustrating a self-latching latching assembly constructed according to the present invention with the bevel gear drive arrangement depending from the bottom of the latch assembly housing for purposes of clarity and illustration.

The drive motor E drives the jaw A in an almost identical manner to that described above. The motor E is connected to first drive transmission means C which includes a bevel gear 40 connected in a ninety degree drive arrangement to a beveled gear 42 which is connected to a jaw drive shaft 44. Drive gear 40 is connected to the drive shaft 45 of motor E. Motor E is not shown in FIG. 1 and motor E and F are shown bottom mounted in FIG. 2 for clearer illustration of the jaw assembly and as an alternative to the top mounting shown in FIG. 1.

The jaw drive shaft 44 is essentially identical to the shaft 14 and is threaded with a screw thread along its length inside the housing 18. The shaft 44 is similarly mounted in two journal bearings as has been described for the shaft 14. The jaw drive shaft 44 is threadably mated with the jaw A by means of a threaded coupling 46 fixed to the jaw which acts like a nut and is pulled over the threads of the jaw drive shaft 44. Since shaft 44 is exactly behind shaft 14 it cannot be seen in FIG. 1, it being understood that shaft 44 is mounted and driven as is shaft 14.

Sensing means for sensing the presence of the adaptor fitting, which is illustrated in FIG. 1 as a keel fitting 50 of a space telescope, is provided in the form of a vertically movable pedestal 52 which moves downwardly when an adaptor spool 50a of the fitting 50 engages the platform pedestal 52 to actuate a pair of microswitches 54 and 56. Two microswitches are utilized for the redundancy required in space operations. The microswitches include cam rollers 56a and 54a which ride upon a cam surface 58 of a post 60 which is integral with the bottom of the platform of pedestal 52. Thus, as the keel fitting 50 engages the platform the post 60 moves downwardly to actuate the microswitches 56 and 54. This will turn on an indicator light (not shown) which will be observed by an operator such as an astronaut in the case of space applications.

The astronaut will then turn on the actuation means (not shown, conventional switches, etc.) for drive motor E which will move the jaw A towards the keel fitting 50 until the first jaw position responsive means G is actuated. Jaw position responsive means G includes a reciprocating plunger 62 which engages the adaptor spool 50a carried adjacent the bottom of keel fitting 50. The plunger 62 is carried extending outwardly from a nose 64 of the jaw A.

The reciprocating plunger is carried in a plunger mechanism 65 which is retractably carried in the jaw. The plunger mechanism is connected to a lever mechanism 66 which is pivoted at 68 and which will allow the plunger to move out of the nose 64 when moved away from a wall 18a of the housing 18. A spring 70 is compressed by an abutment 71 of mechanism 65 which engages a collar 74 and compresses the spring 70 when the upper end 66a of the lever is engaged by the wall 18a as shown in FIG. 1. As the jaw begins to travel to the right, lever 66 is allowed to rotate counter-clockwise under force of spring 70 being released, and the plunger 62 is extended in its sensing position.

As the extended plunger 62, as shown in dotted line (FIG. 1), engages the spool 50a of the keel fitting, a pair of microswitches 72 having cam rollers 72a are actuated by a cam surface 76 of a post 78 which forms part of the plunger 62. The plunger 62 works against a second spring 80 which is compressed when the plunger actuates the microswitches 72. The actuation of the microswitches will then terminate the drive motor E and turn on a second indicator light (not shown). In the latching position, nose 64 of jaw A will be under the flanges of the spool adaptor fitting 50a.

The astronaut then turns on the actuation means (not shown, conventional switches, etc.) for the drive motor F which pulls the jaw B inwardly toward the spool 50a. The jaw B includes a pair of standoff posts 82 on opposing ends of the jaw which engage the opposing surface of jaw A when the nose 83 of jaw B is under the flanges of the spool 50a in a latching relation. As the standoff post 82 engages the jaw A, the block 26 and jaw B become stationary while the block 24 is pulled forward by the threaded connection with the drive shaft 14. As the block 24 comes close to the block 26, the spring washers 34 are compressed and the gap therebetween is closed. Second jaw position responsive means H (FIG. 4) includes a pair of microswitches 84 which are actuated by their rollers 84a engaging a cam surface 86 carried on a flat cam member 90 which is bolted onto the block 24.

In this latching position, there is about five-thousanths of an inch clearance between the faces of jaws A and B and the spool 50a. The spool may move along the longitudinal faces 64a and 83a of jaws A and B but is restrained against vertical movements and lateral movements transverse to the jaw faces. The free movement along the jaw faces is needed to accommodate thermal expansions of the telescope which is rigid in its mounting and must be permitted movement at the keel fitting. The jaw faces are preferably about seven inches long.

The space keel fitting 50 includes a bushing 90 threadably fixed to the fitting 50. Inside the bushing 90 is a plurality of beveled washers 92 which are fitted between the top of the bushing 90 and a bottom bushing 94. The bushings 92 and 94 are held together by means of a bolt 96. The bushing 94 can slide inside the bushing 90. Thus, the washers provide a shock absorber effect for the mounting of the keel. The spring washers will allow the keel fitting to move the distance of a clearance space 98 between the keel fitting 50 and the spool 50a of the fitting. This is necessary to absorb any movement between the fixed structure of the latch assembly and the telescope which is secured by the latch assembly.

When it is desired to unlatch the fitting 50, the motor F is actuated to operate in a reverse direction which will move jaw B to the right. As jaw B moves to the right it will engage a pin 100 which will be compressed against beveled spring washers 102 until a cam portion 104 of the pin engages a pair of rollers 106a of microswitches 106 to terminate the drive of the motor F. An indicator light will indicate to the astronaut that the jaw B is moved to the right. Thereupon, the astronaut will actuate the reverse drive switch of jaw A which will move jaw A to the left in the same manner as described for jaw B, until the end 66a of pivoting linkage 66 abuts the wall 18a. The plunger mechanism 65 will then be retracted to the position shown in FIG. 1 whereupon it will again deactuate the drive motor E by means of the cam post 78 and cam microswitches 72.

The gear 12 is removably mounted on the shaft 14 and by means of a nut 12a, which may be unscrewed from a housing 12b which forms part of the gear, allows the gear to be moved to the right and disengage from the gear 10 so that the motor and movable jaw may be manually disengaged. The same releaseable mounting may be had for gear 42.

It will be understood that while the form of the invention herein shown and described constitutes a preferred embodiment of the invention, it is not intended to illustrate all possible forms of the invention. It will also be understood that the words used are words of description rather than of limitation and that various changes may be made without departing from the spirit and scope of the invention herein disclosed.

What is claimed is:

1. A self-latching latch assembly for latching a fitting, said fitting having an adapter portion which is designed to be latched by said assembly, said assembly comprising:

a base housing;
a first movable jaw carried by said base housing;
a second movable jaw carried by said base housing;
first drive transmission means operatively connected to said first jaw for moving said first jaw on said base housing;
second drive transmission means operatively connected to said second jaw for moving said second jaw on said base housing;
first jaw drive means for driving said first transmission means to move said first jaw;
second jaw drive means for driving said second transmission means to move said second jaw independent of said first jaw;
a positioning pedestal carried by said base housing for receiving said fitting and locating said fitting for latching regardless of its original position;
sensor means for sensing the presence of said fitting on said platform and generating a signal indicating said presence;
first jaw position responsive means for sensing an engagement between said first jaw and said adapter portion of said fitting in a latching position;
second jaw position responsive means for deactuating said second drive means in response to said second jaw arriving at said latching position; and
standoff means carried by said second jaw for engaging said first jaw when said second jaw reaches said latching position so that said first and second jaws are spaced apart a predetermined standoff distance in said latching position with said fitting latched between said jaws.

2. The assembly of claim 1 wherein said first jaw position responsive means includes a reciprocating plunger carried by said first jaw which engages said fitting and is reciprocated thereby to deactuate said first drive means.

3. The assembly of claim 2 wherein said plunger is carried in a plunger mechanism which is retractable in said jaw, said plunger mechanism having a retracted position in which said plunger is entirely carried within said jaw in a deactivated position and an extended position in which said plunger extends from said jaw for engaging said adapter fitting.

4. The assembly of claim 3 including linkage means retractably carrying said plunger mechanism in said first jaws, said linkage means engaging a wall of said base housing when said jaw is moved to a starting position to retract said plunger mechanism, and a spring release for releasing moving said plunger mechanism to its sensing position as said first jaw moves away from said wall.

5. The assembly of claim 2 wherein said plunger includes a plunger body and a widened plunger head which is widened relative to the width of said plunger body for sensing said adaptor fitting at any location along the face of said jaws.

6. The assembly of claim 5 wherein said first position responsive means includes switch means carried by said jaw for deactuating said first drive means, and cam means carried by said plunger body for engaging and actuating said switch in response to engagement and reciprocation of said plunger by said adapter fitting.

7. The assembly of claim 1 wherein said second jaw is attached to said second drive transmission means by a two-piece support housing.

8. The assembly of claim 7 wherein said two-piece support housing includes a first block affixed to said second jaw, a second block affixed to said second drive transmission means, and attachment means for attaching said first and second blocks to each other for relative movement between said first and second support blocks.

9. The assembly of claim 8 wherein said attachment means includes bolts extending through said first and second blocks and resilient means carried on said bolts spacing said first and second blocks apart a predetermined distance, said resilient means being compressed so that said predetermined distance between the blocks can be overcome.

10. The assembly of claim 9 wherein said standoff means of said second jaw engages said first jaw causing said first support block to stop, said second drive means driving until said second block moves relative to said first block said predetermined distance and overcomes said resilient means.

11. The assembly of claim 10 wherein said second position responsive means includes a switch carried by one of said first or second blocks and a cam means carried by the other of said first or second blocks which engages said switch to actuate said switch and produce a signal indicating that said second block has moved said predetermined distance relative to said first block.

12. The assembly of claim 1 wherein said standoff means includes a standoff post extending outwardly from a latching face of said second jaw in the direction of movement of said second jaw.

13. The assembly of claim 1 wherein said first and second jaws include longitudinal latching faces.

14. The assembly of claim 13 wherein said jaws include beveled noses which taper toward a planar face which defines said latching face.

15. The assembly of claim 14 wherein said adapter portion of said fitting includes a spool member rotatably carried on said fitting which is engaged by said jaws, said spool including upper and lower outwardly extending flanges and a reduced diameter hub portion connecting said spool flanges, said beveled noses of said jaws corresponding to said shape of said spool flanges so that when said jaws are in said latching position said spool flanges extend over said beveled noses of said jaws and are latched thereby.

16. The assembly of claim 15 wherein said adapter spool is latched by said jaws so that said fitting is restrained in movement laterally and vertically relative to said jaw faces but is permitted movement transverse to the lateral direction along the longitudinal faces of said jaws.

17. A self-latching assembly for latching a fitting of an associated structure such as a keel fitting on a space telescope, said fitting having an adapter portion which is designed to be latched by said assembly, said assembly comprising:
a base housing;
a first movable jaw carried by said base housing;
a second movable jaw carried by said base housing;
first drive transmission means operatively connected to said first jaw for moving said first jaw on said base housing;
second drive transmission means operatively connected to said second jaw for moving said second jaw on said base housing;
first jaw drive means for driving said first drive transmission means to move said first jaw;
second jaw drive means for driving said second drive transmission means to move said second jaw independently of said first jaw;
a pedestal platform carried by said base housing for receiving and locating said fitting in a latching position;
a plunger mechanism retractably carried by said first jaw within a housing portion of said first jaw having a reciprocating plunger carried therein;
linkage means connected to said plunger mechanism on one end and adapted to bear against a wall of said base housing at an opposite end of said linkage means;
said linkage means retracting said plunger mechanism to a deactivated position when said jaw is adjacent said housing wall and releasing said plunger mechanism when moved toward a latching position to extend said latching mechanism to a sensing position in which said plunger extends outwardly from said jaw;
first jaw position responsive means for sensing arrival of said first jaw in a latching position including a switch means actuated by said plunger when said plunger engages said adapter portion of said keel fitting in said latching position to deactuate said first jaw drive means; and
second jaw position responsive means for deactuating said second drive means in response to said second jaw reaching said latching position wherein said adapter fitting is latched between said first and second jaws.

18. The assembly of claim 17 wherein said second jaw is carried on said base housing by means of a two-piece support block which includes:
a first block affixed to said second jaw;
a second block operatively connected to said second transmission drive means for being moved positively; and
attachment means connecting said first and second blocks together so that they move relative to each other.

19. A self-latching latch assembly for latching a fitting of an associated structure such as a keel fitting on a space telescope, said fitting having an adapter portion which is designed to be latched by said assembly, said assembly comprising:
a base housing;
first movable jaw carried by said base housing;
a second movable jaw carried by said base housing;
drive means for moving said first and second jaws on said base housing to a latching position;
means carried by said first jaw for sensing the arrival of said first jaw to said latching position;
said first jaw being movable to said latching position before said second jaw is moved;
standoff means carried by said second jaw for stopping said second jaw in said latching position a predetermined distance from said first jaw so that said adapter portion of said fitting is caught and latched between said first and second jaws and restrained in two directions while being permitted movement in a third direction parallel to the face of said jaws;
a two-piece support block supporting said second jaw on said base housing;
said support block including a first block affixed to said second jaw and a second block operatively connected to said drive means wherein said first and second blocks are movable relative to each other, and
means connecting said first and second blocks such that they are movable relative to each other so that when said standoff means of said second jaw engages the first jaw, said second jaw and first block are stopped and said second block continues to be driven by said drive means until a gap between said first and second block is closed.

* * * * *